United States Patent
Li et al.

(10) Patent No.: US 12,218,755 B2
(45) Date of Patent: Feb. 4, 2025

(54) DATA TRANSMISSION METHOD AND APPARATUS, STORAGE MEDIUM, AND DEVICE

(71) Applicant: TENCENT TECHNOLOGY (SHENZHEN) COMPANY LIMITED, Guangdong (CN)

(72) Inventors: Jian Li, Shenzhen (CN); Peng Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 377 days.

(21) Appl. No.: 17/715,507

(22) Filed: Apr. 7, 2022

(65) Prior Publication Data
US 2022/0231792 A1 Jul. 21, 2022

Related U.S. Application Data

(63) Continuation of application No. PCT/CN2020/129811, filed on Nov. 18, 2020.

(30) Foreign Application Priority Data

Mar. 9, 2020 (CN) .......................... 202010157500.1

(51) Int. Cl.
*H04L 43/0829* (2022.01)
*H04L 1/1607* (2023.01)

(52) U.S. Cl.
CPC ........ *H04L 1/1621* (2013.01); *H04L 43/0829* (2013.01)

(58) Field of Classification Search
CPC . H04L 1/1621; H04L 43/0829; H04L 1/1607; H04L 1/0028; H04L 1/0084; H04L 1/0085; H04L 69/163
See application file for complete search history.

(56) References Cited

U.S. PATENT DOCUMENTS

| | | | |
|---|---|---|---|
| 11,658,874 B2 * | 5/2023 | Banka | H04L 43/14 709/224 |
| 2003/0103521 A1 * | 6/2003 | Raphaeli | H04L 1/0007 370/473 |

(Continued)

FOREIGN PATENT DOCUMENTS

| CN | 1946078 A | 4/2007 |
|---|---|---|
| CN | 101006684 A | 7/2007 |

(Continued)

OTHER PUBLICATIONS

First Office Action of Chinese Application No. 202010157500.1 dated Mar. 26, 2021.

(Continued)

*Primary Examiner* — Atique Ahmed
(74) *Attorney, Agent, or Firm* — Sughrue Mion, PLLC

(57) ABSTRACT

A data transmission method and apparatus, a storage medium, and a device, are provided, in the field of cloud technologies. The method includes: receiving at least one data packet among data packets transmitted by a transmitting end in a data transmission round; and transmitting a response data packet for the data transmission round to the transmitting end, the response data packet including a target field, and the target field indicating a received data packet and an unreceived data packet at the receiving end, among the data packets transmitted in the data transmission round. The response data may indicate an arrival situation of the data packet in detail, so that the transmitting end may further determine which data packets have arrived and which data packets have not arrived.

20 Claims, 8 Drawing Sheets

(56) References Cited

U.S. PATENT DOCUMENTS

| | | | | |
|---|---|---|---|---|
| 2003/0108044 | A1* | 6/2003 | Hendel | H04L 69/163 370/392 |
| 2004/0136370 | A1* | 7/2004 | Moore | H04L 47/2441 370/389 |
| 2004/0174886 | A1* | 9/2004 | Packer | H04L 1/0018 370/473 |
| 2006/0048034 | A1* | 3/2006 | Cho | H04L 1/1614 714/749 |
| 2006/0146887 | A1* | 7/2006 | Muguruma | H04W 56/00 370/503 |
| 2014/0313996 | A1 | 10/2014 | Suga | |
| 2015/0010042 | A1* | 1/2015 | Li | H04B 1/7176 375/138 |
| 2016/0006837 | A1* | 1/2016 | Reynolds | H04L 67/34 709/203 |
| 2020/0366455 | A1* | 11/2020 | Han | H04L 5/1469 |
| 2021/0091844 | A1* | 3/2021 | Koskela | H04B 7/0617 |

FOREIGN PATENT DOCUMENTS

| | | |
|---|---|---|
| CN | 107276727 A | 10/2017 |
| CN | 109600316 A | 4/2019 |
| CN | 110620638 A | 12/2019 |

OTHER PUBLICATIONS

Second Office Action of Chinese Application No. 202010157500.1 dated Jun. 30, 2021.

Third Office Action of Chinese Application No. 202010157500.1 dated Nov. 3, 2021.

International Search Report of PCT/CN2020/129811 dated Jan. 18, 2021 [PCT/ISA/210].

Written Opinion of PCT/CN2020/129811 dated Jan. 18, 2021 [PCT/ISA/237].

* cited by examiner

<PRIOR ART>

<PRIOR ART>

DATA TRANSMISSION METHOD AND APPARATUS, STORAGE MEDIUM, AND DEVICE

CROSS-REFERENCE TO RELATED APPLICATION(S)

This application is a continuation application of International Application No. PCT/CN2020/129811, filed Nov. 18, 2020 which claims priority to Chinese Patent Application No. 202010157500.1, filed on Mar. 9, 2020, with the China National Intellectual Property Administration, the disclosures of which are incorporated by reference in their entireties.

FIELD

The disclosure relates to the field of cloud technologies, and in particular, to a data transmission method and apparatus, a storage medium, and a device.

BACKGROUND

In data communication based on the Transmission Control Protocol (TCP), reliable data transmission depends on an acknowledgment response mechanism. An acknowledge character (ACK) is a transmission-type control character transmitted by a receiving end to a transmitting end during data communication, and is used for indicating that data transmitted by the transmitting end has been acknowledged to be correctly received. In other words, an emergency such as packet loss may inevitably occur in the data communication due to the unreliability of a communication process. The TCP designs the acknowledgment response mechanism to resolve such emergency, that is, after the transmitting end transmits data to the receiving end, the receiving end further needs to return the ACK to the transmitting end.

FIG. 1 is a schematic structural diagram of a TCP packet header 101 in the related art. In FIG. 1, an ACK number occupies 32 bits and is used for returning a next serial number of a data packet expectedly received by the receiving end to the transmitting end. For example, if a data packet currently transmitted by a host A has a serial number of 401 and a data length of 100, the receiving end returns an arrival acknowledgment with an ACK number of 501 to the host A after receiving the data packet.

The foregoing data transmission manner cannot resolve an emergency such as packet loss. For example, assuming that packet loss occurs while the transmitting end continuously transmits five data packets with serial numbers of 1 to 5, and the receiving end only receives data packets with serial numbers of 1 and 5, data packets with serial numbers of 2 to 4 are lost. In this case, the receiving end may only acknowledge the data packet with the serial number of 1, that is, transmit an ACK with an ACK number of 2 to the transmitting end. However, the transmitting end cannot determine an arrival situation of each data packet after receiving the ACK, and may only retransmit the data packet with the serial number of 2. Therefore, such data transmission manner has a poor effect.

SUMMARY

Example embodiments of the disclosure provide a data transmission method and apparatus, a storage medium, and a device, in which data transmission manner may better handle transmission failure such as packet loss and thus has an improved effect.

According to an aspect of an example embodiment, provided is a data transmission method, performed by a receiving end, the method including: receiving at least one data packet among data packets transmitted by a transmitting end in a data transmission round; and transmitting, to the transmitting end, a response data packet for the data transmission round, the response data packet including a target field, the target field indicating a received data packet and an unreceived data packet at the receiving end, among the data packets transmitted in the data transmission round.

According to an aspect of an example embodiment, provided is a data transmission method, performed by a transmitting end, the method including: transmitting, to a receiving end, data packets in a data transmission round; and receiving, from the receiving end, a response data packet for the data transmission round, the response data packet including a target field, the target field indicating a received data packet and an unreceived data packet at the receiving end, among the data packets transmitted in the data transmission round.

According to an aspect of an example embodiment, provided is a data transmission apparatus as a receiving end, the apparatus including: at least one memory configured to store program code; and at least one processor configured to read the program code and operate as instructed by the program code, the program code including: receiving code configured to cause the at least one processor to receive at least one data packet among data packets transmitted by a transmitting end in a data transmission round; and transmitting code configured to cause the at least one processor to transmit, to the transmitting end, a response data packet for the data transmission round, the response data packet including a target field, and the target field indicating a received data packet and an unreceived data packet at the receiving end, among the data packets transmitted in the data transmission round.

The target field may include an ACK_start field, M first-class data bits, and N second-class data bits; the M first-class data bits and the N second-class data bits may appear alternately, and M and N may be positive integers; a first serial number may be recorded in the ACK_start field, the first serial number corresponding to a head data packet received by the receiving end in the data transmission round; and a quantity of one or more data packets continuously received by the receiving end in the data transmission round may be recorded in the M first-class data bits, and a quantity of one or more data packets continuously lost by the receiving end in the data transmission round may be recorded in the N second-class data bits.

The data transmission round may be determined based on a time at which the transmitting end provides data to a network interface card.

The response data packet may further include: a round field, a sendCount field, a recvCount field, and an end_idx field; a round identifier of the data transmission round may be recorded in the round field; a quantity of data packets transmitted by the transmitting end in the data transmission round may be recorded in the sendCount field; a quantity of data packets received by the receiving end in the data transmission round may be recorded in the recvCount field; and a second serial number of a first data packet may be recorded in the end_idx field, the first data packet being a tail data packet acknowledged and received by the receiving end in the data transmission round.

The response data packet may further include: a delayed field and a usend field; a first time may be recorded in the delayed field, the first time being a time by which the receiving end delays transmitting the response data packet in the data transmission round; and a second time may be recorded in the usend field, the second time being a time at which the transmitting end transmits data in the data transmission round.

The response data packet may further include: a type field, a first ACK_size field, a second ACK_size field, a checksum field, a recvRate field, and a pmiss field; a data packet type may be recorded in the type field; a size of the target field may be recorded in the first ACK_size field; a size of the response data packet may be recorded in the second ACK_size field; a data receiving rate determined by the receiving end in the data transmission round may be recorded in the recvRate field; and a packet loss rate determined by the receiving end in the data transmission round may be recorded in the pmiss field.

The method may further include: determining a third serial number of a second data packet; and determining the second serial number of the first data packet based on the third serial number of the second data packet and a target serial number threshold, the second data packet being a data packet finally received by the receiving end in the data transmission round, and the second serial number being less than the third serial number.

The method may further include: transmitting a response data packet for the second data packet to the transmitting end based on an arrival time of the second data packet exceeding a round-trip time (RTT), the RTT being determined based on a first time, a second time, and a third time, the first time being a time by which the receiving end delays transmitting the response data packet in the data transmission round, the second time being a time at which the transmitting end transmits data in the data transmission round, and the third time being a time at which the transmitting end receives the response data packet for the data transmission round.

According to an aspect of an example embodiment, provided is a data transmission apparatus as a transmitting end, the apparatus including: at least one memory configured to store program code; and at least one processor configured to read the program code and operate as instructed by the program code, the program code including: transmitting code configured to cause the at least one processor to, to a receiving end, data packets in a data transmission round; and receiving code configured to cause the at least one processor to receive, from the receiving end, a response data packet for the data transmission round, the response data packet including a target field, the target field indicating a received data packet and an unreceived data packet at the receiving end, among the data packets transmitted in the data transmission round.

The target field may include an ACK_start field, M first-class data bits, and N second-class data bits; the M first-class data bits and the N second-class data bits may appear alternately, and M and N may be positive integers; a first serial number may be recorded in the ACK_start field, the first serial number corresponding to a head data packet received by the receiving end in the data transmission round; and a quantity of one or more data packets continuously received by the receiving end in the data transmission round may be recorded in the M first-class data bits, and a quantity of one or more data packets continuously lost by the receiving end in the data transmission round may be recorded in the N second-class data bits.

The data transmission round may be determined based on a time at which the transmitting end provides data to a network interface card.

The response data packet may further include: a round field, a sendCount field, a recvCount field, and an end_idx field; a round identifier of the data transmission round may be recorded in the round field; a quantity of data packets transmitted by the transmitting end in the data transmission round may be recorded in the sendCount field; a quantity of data packets received by the receiving end in the data transmission round may be recorded in the recvCount field; and a second serial number of a first data packet may be recorded in the end_idx field, the first data packet being a tail data packet acknowledged and received by the receiving end in the data transmission round.

The response data packet may further include: a delayed field and a usend field; a first time may be recorded in the delayed field, the first time being a time by which the receiving end delays transmitting the response data packet in the data transmission round; and a second time may be recorded in the usend field, the second time being a time at which the transmitting end transmits data in the data transmission round.

The response data packet may further include: a type field, a first ACK_size field, a second ACK_size field, a checksum field, a recvRate field, and a pmiss field; a data packet type may be recorded in the type field; a size of the target field may be recorded in the first ACK_size field; a size of the response data packet may be recorded in the second ACK_size field; a data receiving rate determined by the receiving end in the data transmission round may be recorded in the recvRate field; and a packet loss rate determined by the receiving end in the data transmission round may be recorded in the pmiss field.

The method may further include: determining a third serial number of a second data packet; and determining the second serial number of the first data packet based on the third serial number of the second data packet and a target serial number threshold, the second data packet being a data packet finally received by the receiving end in the data transmission round, and the second serial number being less than the third serial number.

The method may further include: transmitting a response data packet for the second data packet to the transmitting end based on an arrival time of the second data packet exceeding a round-trip time (RTT), the RTT being determined based on a first time, a second time, and a third time, the first time being a time by which the receiving end delays transmitting the response data packet in the data transmission round, the second time being a time at which the transmitting end transmits data in the data transmission round, and the third time being a time at which the transmitting end receives the response data packet for the data transmission round.

According to an aspect of an example embodiment, an electronic device is provided, including a processor and a memory, the memory storing at least one instruction, and the at least one instruction being loaded and executed by the processor to implement the foregoing data transmission method implemented by the transmitting end.

According to an aspect of an example embodiment, an electronic device is provided, including a processor and a memory, the memory storing at least one instruction, and the at least one instruction being loaded and executed by the processor to implement the foregoing data transmission method implemented by the receiving end.

According to an aspect of an example embodiment, a non-transitory computer-readable storage medium is provided, storing at least one instruction, the at least one instruction being loaded and executed by a processor to implement the foregoing data transmission method implemented by the transmitting end.

According to an aspect of an example embodiment, a non-transitory computer-readable storage medium is provided, storing at least one instruction, the at least one instruction being loaded and executed by a processor to implement the foregoing data transmission method implemented by the receiving end.

BRIEF DESCRIPTION OF THE DRAWINGS

To describe technical solutions in embodiments of the disclosure more clearly, the following briefly introduces accompanying drawings required for describing the embodiments. Apparently, the accompanying drawings in the following description show merely some embodiments of the disclosure, and a person of ordinary skill in the art may still derive other accompanying drawings according to the accompanying drawings without creative efforts.

DETAILED DESCRIPTION

Figure 1:
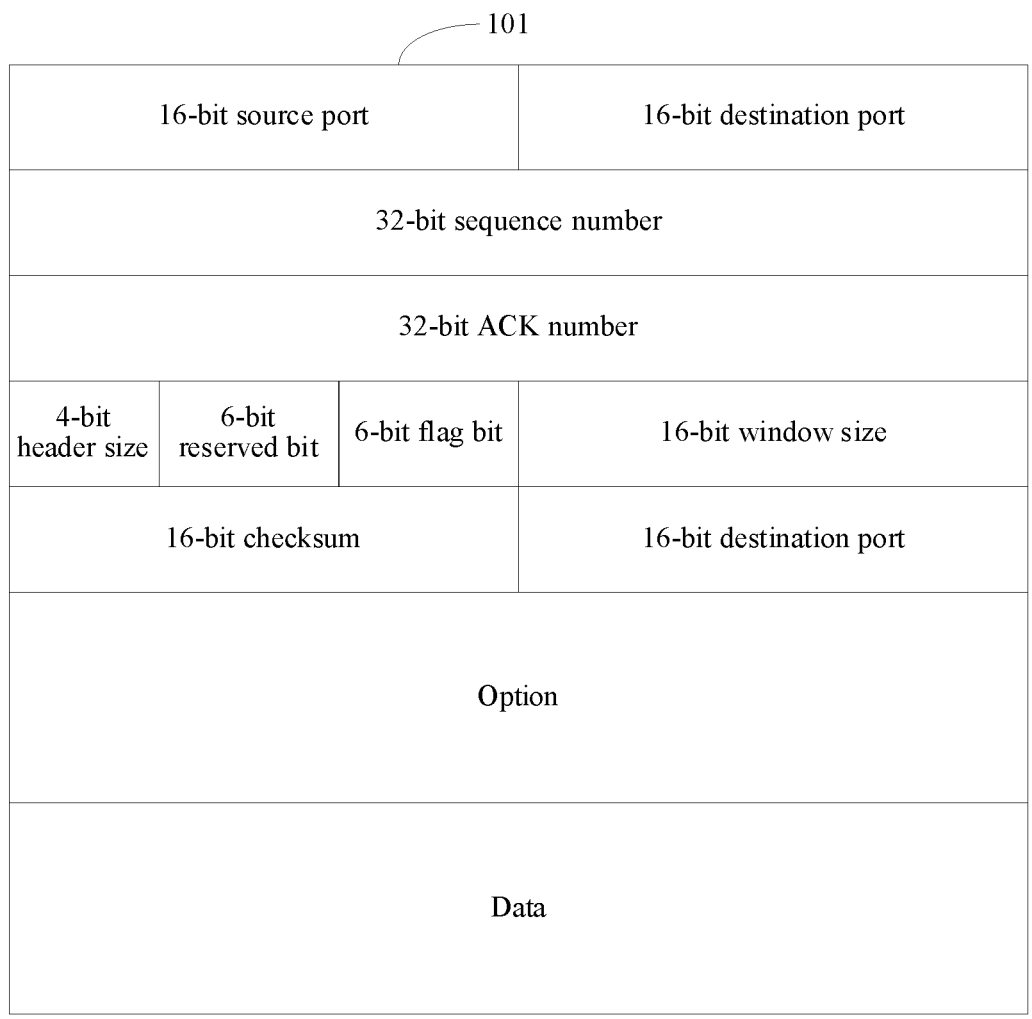
FIG. 1 is a schematic structural diagram of a Transmission Control Protocol (TCP) packet header in the related art.

To make objectives, technical solutions, and advantages of the disclosure clearer, implementations of the disclosure are further described below in detail with reference to the accompanying drawings.

A cloud technology is a hosting technology that unifies a series of resources such as hardware, software, and networks in a wide area network or a local area network to implement computing, storage, processing, and sharing of data.

In addition, the cloud technology is also a collective name of a network technology, an information technology, an integration technology, a management platform technology, an application technology, and the like applied based on a cloud computing service mode, and may form a resource pool, which is used as required and is flexible and convenient. The cloud computing technology becomes an important support. A background service of a technical network system requires a large amount of computing and storage resources, such as a video website, an image website, and more portal websites. As the Internet industry is highly developed and applied, each article may have its own identifier in the future and needs to be transmitted to a backend system for logical processing. Data at different levels is separately processed, and data in various industries requires strong system support, which may only be implemented through cloud computing.

The embodiments of the disclosure relate to data transmission technologies based on a network transport protocol in the cloud technologies. The data transmission solution provided in the embodiments of the disclosure is described in detail below with reference to the following implementations.

First, some terms and abbreviations involved in the embodiments of the disclosure are explained as follows:

A Transmission Control Protocol (TCP) is a connection-oriented, reliable, and byte stream-based transport layer communication protocol, which is defined by RFC 793 of the Internet Engineering Task Force (IETF).

Being connection-oriented means that applications using the TCP needs to establish a connection before data transmission. Reliable transmission service means that a transmitting end (or transmitting terminal or transmitter) may accurately and reliably transmit data to a receiving end (or receiving terminal or receiver). Byte stream service means that for ease of transmission, bulk data is divided into data packets for management. That is, the TCP divides data to transmit the bulk data more easily, and the TCP may determine whether data is finally transmitted to the receiving end.

A packet refers to a data unit for data transmission in TCP communication transmission, which is also generally referred to as a data packet.

That is, the bulk data is divided into data packets considered by the TCP to be most suitable for transmission. For example, the bulk data needs to be divided into a plurality of data packets for transmission. For example, a 10 MB file may be divided into thousands of data packets.

A serial number is used for identifying a data byte stream transmitted from the transmitting end to the receiving end, and indicates the first byte in the data packet. If the byte stream is regarded to flow unidirectionally between two applications, the TCP counts each byte with the serial number. That is, the serial number is a sequence number of each byte in an entire byte stream.

A data packet includes data of a plurality of byte streams, and data sizes of data packets are not necessarily the same. In some embodiments, a serial number of the first data packet transmitted by the transmitting end to the receiving end is a random number. This is not specifically limited in the embodiments of the disclosure.

In other words, when data is transmitted, the TCP provides a sequence number (seq for short) for each data packet, so that the receiving end restores according to the sequence. In addition, it may be known which data packet is lost in case of packet loss. Therefore, in this specification, the sequence number of each data packet is referred to as the serial number of each data packet.

An acknowledgement (ACK) is a transmission-type control character transmitted by a receiving end to a transmitting end during data communication, and is used for indicating that data transmitted by the transmitting end has been acknowledged to be correctly received.

In the TCP, the receiving end returns an ACK data packet to the transmitting end after successfully receiving data, which indicates that all data before an ACK number has been acknowledged as having been received. In other words, when the data transmitted by the transmitting end arrives at the receiving end, the receiving end returns a message indicating that data has been received. The message is referred to as an acknowledgment response, and indicates that the transmitted data has been received. That is, the TCP achieves reliable data transmission through the ACK.

The transmitting end waits for the acknowledgment response from the receiving end after transmitting data. If the acknowledgment response is received by the transmitting end, it indicates that the data has successfully arrived at the receiving end. If the acknowledgment response is not received by the transmitting end within a specific time, the transmitting end may consider that the data has been lost and retransmit the data.

A round-trip time (RTT) is an important performance indicator in a computer network, and refers to a total of time taken from a time at which the transmitting end transmits data to a time at which the transmitting end receives an acknowledgment from the receiving end (the receiving end immediately transmits the acknowledgment after receiving the data).

A delay ACK, briefly, refers to delaying transmitting an ACK. Generally, the receiving end immediately replies an ACK to the transmitting end after receiving a data packet, the transmitting end transmits a next data packet, then the receiving end replies again, and so on. Since the efficiency of acknowledging once after receiving one data packet is relatively low, the receiving end attempts to acknowledging once after receiving multiple data packets. This is the delay ACK. For example, if the receiving end receives three data packets with serial numbers of 201, 301, and 401 respectively, the receiving end may only acknowledge the data packet with the serial number of 401. Acknowledging the data packet with the serial number of 401 means that all data packets before the data packet 401 have been acknowledged.

In some embodiments, a separate ACK is not transmitted in response to each data packet by using a delay ACK mechanism. Therefore, during communication, the receiving end may transmit the ACK when data is transmitted by the transmitting end.

A selective acknowledgment (SACK) is a TCP option and is defined by RFC 2018, 2883, and 3517. The receiving end may transmit the SACK only when receiving out-of-sequence data packets, that is, the SACK is only set for the data packets arriving out of sequence.

Figure 2:
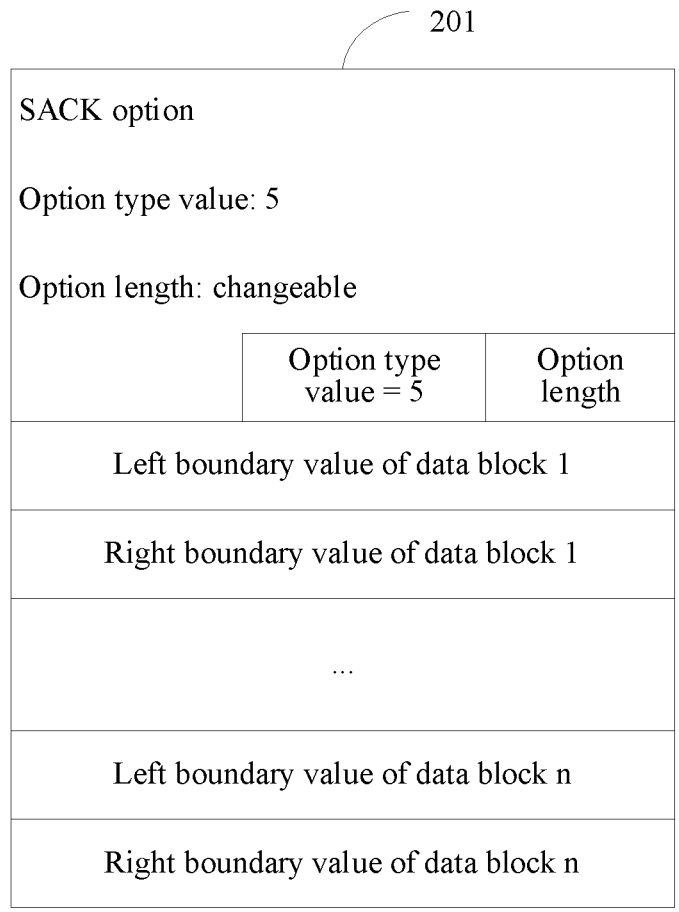
FIG. 2 is a schematic diagram of a format of a selective acknowledgment (SACK) option according to the related art.

An ACK includes two TCP options, one is a SACK permitted option used for identifying whether the SACK is supported and is transmitted when a TCP connection is established; and the other is a SACK option 201 shown in FIG. 2, which includes specific SACK information. To use the SACK, two devices used as a transmitting end and a receiving end need to both support the SACK, and the SACK permitted option needs to be used when the connection is established. If permitted, a data packet may carry a SACK option during subsequent data transmission.

A format of the SACK option 201 is shown in FIG. 2, a length of the SACK option is changeable, but a length of an entire TCP option does not exceed 40 bytes. Therefore, an actual length of the SACK option does not exceed 4 sets of boundary values. The SACK option informs the transmitting end which data packets are discontinuous data packets that have been received by the receiving end, and the transmitting end may check which data packet is lost, to retransmit a corresponding data packet. That is, the SACK option includes a serial number interval of a series of discontinuous and unacknowledged data packets. A left edge of block refers to a serial number of the first data packet in a received and discontinuous block, which is also referred to as a left boundary value of a data block. A right edge of block refers to a serial number of the last data packet in the received and discontinuous block, which is also referred to as a right boundary value of the data block.

An implementation environment involved in the data transmission solution provided in the embodiments of the disclosure is described below.

Figure 3:
FIG. 3 is a schematic diagram of an implementation environment involved in a data transmission solution according to an embodiment of the disclosure.

In some embodiments, referring to FIG. 3, the implementation environment includes a transmitting end 301 and a receiving end 302.

Figure 4:
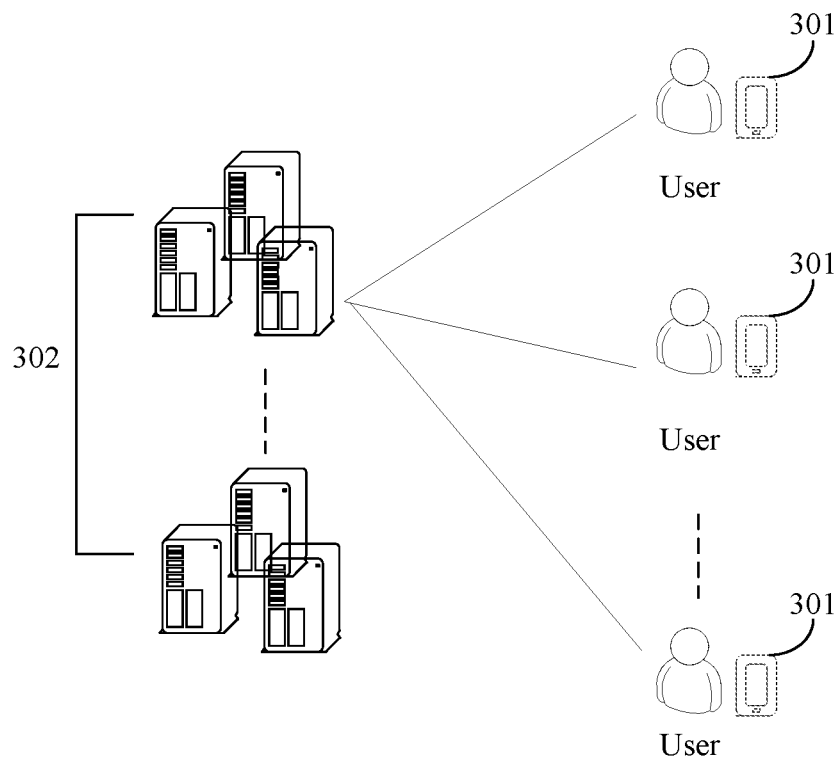
FIG. 4 is a schematic diagram of an implementation environment involved in a data transmission solution according to an embodiment of the disclosure.

In some embodiments, as shown in FIG. 4, the data transmission solution provided in the embodiments of the disclosure may be applied to a scenario in which a server provides data such as a video, an image, and a file to a terminal.

For example, the solution may be applied to a peer-to-peer (P2P) transmission scenario of a live video, to provide a stable and reliable transmission channel for video data transmission. In such scenario, the transmitting end 301 is a server, and the receiving end 302 is a terminal.

In some embodiments, the server is an independent physical server, or a server cluster or a distributed system formed by a plurality of physical servers, or a cloud server that provides a basic cloud computing service such as a cloud service, a cloud database, cloud computing, a cloud function, cloud storage, a network service, cloud communication, a middleware service, a domain name service, a security service, a content delivery network (CDN), big data, and an artificial intelligence platform. The terminal is a smartphone, a tablet computer, a notebook computer, a desktop computer, a smart speaker, a smartwatch, or the like, but is not limited thereto.

The terminal and the server are directly or indirectly connected in a wired or wireless communication manner. This is not limited in the disclosure. In addition, data transmission between the transmitting end 301 and the receiving end 302 is bidirectional, that is, identities of the transmitting end 301 and the receiving end 302 are interchangeable.

Based on the foregoing implementation environment, an embodiment of the disclosure provides a data transmission solution based on a new ACK mechanism, which ensures reliable transmission of the network. The solution is as follows:

a. A transmitting end periodically transmits data according to a data transmission round and marks each data transmission round, so that finer-grained statistics may be performed on the data, thereby improving accuracy of data statistics. The data transmission round is determined according to a time at which the transmitting end provides data to a network interface card.

b. A new ACK structure is designed, which may represent more data, that is, richer ACK data is provided.

In a response data packet transmitted by a receiving end, a structure including, e.g., a received data amount—an unreceived data amount-a received data amount—an unreceived data amount . . . is used to indicate which data packet has arrived and which data packet has not arrived. Compared with a SACK manner that may only represent at most 4 sets of intervals, in the embodiments of the disclosure, an arrival situation of more data may be represented in detail. In addition, in a case that data aggregation occurs, the storage efficiency may also be significantly improved in such representation manner.

c. The ACK corresponds to the data transmission round. That is, the ACK is transmitted according to the round, so that the transmission frequency of the ACK may be greatly reduced, avoiding occupying a network bandwidth and reducing data waste.

d. A tail data packet that needs to return the ACK is optimized. To deal with out-of-sequence arrival of the data packets, ACKNDUPACK is added (the tail data packet is fed back later). In addition, to resolve a problem that the tail data packet cannot feed back the ACK, a timeout mechanism is added. That is, the receiving end feeds back the ACK to the transmitting end if an arrival time of the tail data packet exceeds an RTT.

The data transmission solution provided in the embodiments of the disclosure is described in detail below with reference to the following embodiments.

Figure 5:
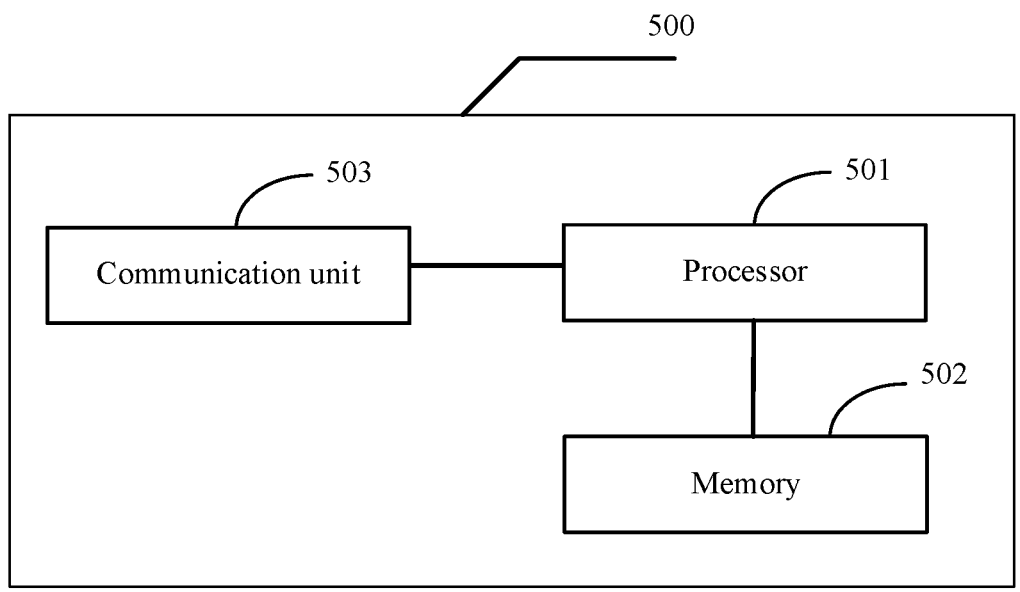
FIG. 5 is a schematic structural diagram of a server according to an embodiment of the disclosure.

FIG. 5 is a schematic structural diagram of a server according to an embodiment of the disclosure. In some embodiments, the server is the transmitting end 301 or the receiving end 302 shown in FIG. 3 or FIG. 4.

The server 500 may vary greatly due to different configurations or performance, and includes one or more processors (central processing units (CPUs)) 501, one or more memories 502, and a communication unit 503. The memory 502 stores at least one instruction. The at least one instruction is loaded and executed by the processor 501 to implement the data transmission method provided in the embodiments of the disclosure. The communication unit 503 is configured to transmit and receive data.

The server further includes a wired or wireless network interface, a keyboard, an input/output (I/O) interface and other components to facilitate I/O. The server may further include other components for implementing device functions. Details are not described herein again.

Figure 6:
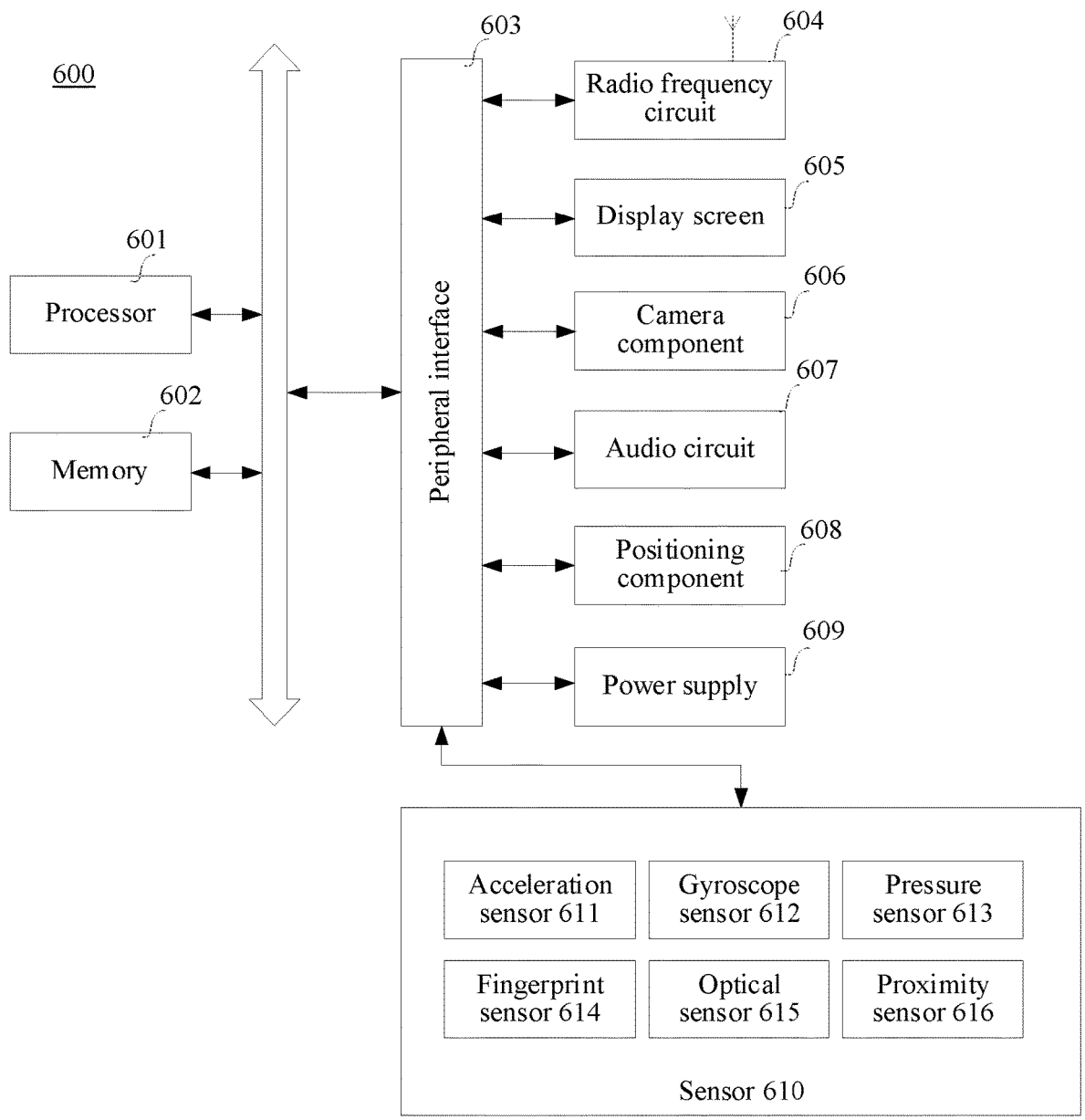
FIG. 6 is a schematic structural diagram of a terminal according to an embodiment of the disclosure.

FIG. 6 is a schematic structural diagram of a terminal according to an embodiment of the disclosure. The terminal is the transmitting end 301 or the receiving end 302 shown in FIG. 3 or FIG. 4.

Generally, a terminal 600 includes a processor 601 and a memory 602.

The processor 601 includes one or more processing cores, for example, a 4-core processor, and an 8-core processor. The processor 601 may be implemented by using at least one hardware form of a digital signal processor (DSP), a field-programmable gate array (FPGA), and a programmable logic array (PLA). The processor 601 alternatively includes a main processor and a coprocessor. The main processor is configured to process data in an awake state, also referred to as a CPU; and the coprocessor is a low-power processor configured to process data in a standby state. In some embodiments, the processor 601 may be integrated with a graphics processing unit (GPU). The GPU is configured to render and draw content that needs to be displayed on a display screen. In some embodiments, the processor 601 further includes an artificial intelligence (AI) processor. The AI processor is configured to process computing operations related to machine learning.

The memory 602 includes one or more computer-readable storage media that may be non-transitory. The memory 602 further includes a high-speed random access memory (RAM), and a non-volatile memory such as one or more magnetic disk storage devices and a flash storage device. In some embodiments, a non-transitory computer-readable storage medium in the memory 602 is configured to store at least one instruction, the at least one instruction being configured to be executed by the processor 601 to implement the data transmission method provided in the method embodiments of the disclosure.

In some embodiments, the terminal 600 may optionally include a peripheral interface 603 and at least one peripheral. The processor 601, the memory 602, and the peripheral interface 603 may be connected through a bus or a signal cable. Each peripheral is connected to the peripheral interface 603 through a bus, a signal cable, or a circuit board. In some embodiments, the peripheral includes: at least one of a radio frequency (RF) circuit 604, a display screen 605, a camera assembly 606, an audio circuit 607, a positioning component 608, and a power supply 609.

The peripheral interface 603 is configured to connect at least one peripheral related to I/O to the processor 601 and the memory 602. In some embodiments, the processor 601, the memory 602, and the peripheral interface 603 are integrated on the same chip or the same circuit board. In some other embodiments, any one or two of the processor 601, the memory 602, and the peripheral interface 603 may be implemented on an independent chip or circuit board. This is not limited in this embodiment of the disclosure.

The RF circuit 604 is configured to receive and transmit an RF signal, which is also referred to as an electromagnetic signal. The RF circuit 604 communicates with a communication network and another communication device by using the electromagnetic signal. The RF circuit 604 converts an electric signal into an electromagnetic signal for transmission, or converts a received electromagnetic signal into an electric signal. In some embodiments, the RF circuit 604 includes: an antenna system, an RF transceiver, one or more amplifiers, a tuner, an oscillator, a digital signal processor, a codec chip set, a subscriber identity module card, or the like. The RF circuit 604 may communicate with another terminal by using at least one wireless communication protocol. The wireless communication protocol includes, but is not limited to: a world wide web, a metropolitan area network, an intranet, generations of mobile communication networks (2G, 3G, 4G, and 5G), a wireless local area network, and/or a Wi-Fi network. In some embodiments, the RF circuit 604 may further include a circuit related to near field communication (NFC), which is not limited in the disclosure.

The display screen 605 is configured to display a user interface (UI). The UI may include a graph, a text, an icon, a video, and any combination thereof. When the display screen 605 is a touch display screen, the display screen 605 also has a capability of collecting a touch signal on or above a surface of the display screen 605. The touch signal may be inputted to the processor 601 for processing as a control signal. In this case, the display screen 605 is further configured to provide a virtual button and/or a virtual keyboard, which is also referred to as a soft button and/or a soft keyboard. In some embodiments, there is one display screen 605 disposed on a front panel of the terminal 600. In some other embodiments, there are at least two display screens 605, disposed on different surfaces of the terminal 600 respectively or in a folded design. In some other embodiments, the display screen 605 is a flexible display screen disposed on a curved surface or a folded surface of the terminal 600. The display screen 605 may be further set to have a non-rectangular irregular pattern, that is, a special-shaped screen. The display screen 605 may be manufactured by using a material such as a liquid crystal display (LCD) or an organic light-emitting diode (OLED).

The camera component 606 is configured to capture images or videos. In some embodiments, the camera assembly 606 includes a front-facing camera and a rear-facing camera. Generally, the front-facing camera is disposed on the front panel of the terminal, and the rear-facing camera is disposed on a back surface of the terminal. In some embodiments, there are at least two rear cameras, which are respectively any of a main camera, a depth-of-field camera, a wide-angle camera, and a telephoto camera, to implement background blur through fusion of the main camera and the depth-of-field camera, panoramic photographing and virtual reality (VR) photographing through fusion of the main camera and the wide-angle camera, or other fusion photographing functions. In some embodiments, the camera component 606 further includes a flash. The flash is a single color temperature flash or a double color temperature flash. The double color temperature flash refers to a combination of a warm-light flash and a cold-light flash, and may be used for light compensation under different color temperatures.

The audio circuit 607 includes a microphone and a speaker. The microphone is configured to collect sound waves of a user and an environment, and convert the sound waves into electric signals and input the electric signals into the processor 601 for processing, or input the electric signals into the RF circuit 604 to implement speech communication. For the purpose of stereo acquisition or noise reduction, there may be a plurality of microphones respectively disposed at different parts of the terminal 600. Alternatively, the microphone is an array microphone or an omni-directional acquisition microphone. The speaker is configured to convert electric signals from the processor 601 or the RF circuit 604 into sound waves. The speaker is a conventional thin-film speaker or a piezoelectric ceramic speaker. When the speaker is the piezoelectric ceramic speaker, electrical signals not only may be converted into sound waves that may be heard by human, but also may be converted into sound waves that cannot be heard by human for ranging or other uses. In some embodiments, the audio circuit 607 further includes an earphone jack.

The positioning component 608 is configured to determine a current geographic location of the terminal 600, to implement navigation or a location-based service (LBS). The positioning component 608 is a positioning assembly based on the Global Positioning System (GPS) of the United States, the Beidou Navigation Satellite System (BDS) of China, or the Galileo system of Russia.

The power supply 609 is configured to supply power to components in the terminal 600. The power supply 609 is an alternating current, a direct current, a disposable battery, or a rechargeable battery. When the power supply 609 includes a rechargeable battery, the rechargeable battery is a wired rechargeable battery or a wireless rechargeable battery. The wired charging battery is a battery charged through a wired line, and the wireless charging battery is a battery charged through a wireless coil. The rechargeable battery is further configured to support a fast charge technology.

In some embodiments, the terminal 600 further includes one or more sensors 610. The one or more sensors 610 include, but are not limited to, an acceleration sensor 611, a gyroscope sensor 612, a pressure sensor 613, a fingerprint sensor 614, an optical sensor 615, and a proximity sensor 616.

The acceleration sensor 611 detects a magnitude of acceleration on three coordinate axes of a coordinate system established by the terminal 600. For example, the acceleration sensor 611 is configured to detect components of the gravity acceleration on the three coordinate axes. The processor 601 controls, according to a gravity acceleration signal collected by the acceleration sensor 611, the display screen 605 to display the UI in a landscape view or a portrait view. The acceleration sensor 611 is further configured to acquire motion data of a game or a user.

The gyroscope sensor 612 detects a body direction and a rotation angle of the terminal 600. The gyroscope sensor 612 acquires a 3D action of the user on the terminal 600 together with the acceleration sensor 611. The processor 601 implements the following functions according to the data acquired by the gyroscope sensor 612: motion sensing (for example, changing the UI according to a tilt operation of the user), image stabilization during shooting, game control, and inertial navigation.

The pressure sensor 613 may be disposed on a side frame of the terminal 600 and/or a lower layer of the display screen 605. When the pressure sensor 613 is disposed at the side frame of the terminal 600, a holding signal of the user on the terminal 600 is detected. The processor 601 performs left and right hand recognition or a quick operation according to the holding signal collected by the pressure sensor 613. When the pressure sensor 613 is disposed on the low layer of the display screen 605, the processor 601 controls, according to a pressure operation of the user on the display screen 605, an operable control on the UI. The operable control includes at least one of a button control, a scroll-bar control, an icon control, and a menu control.

The fingerprint sensor 614 is configured to collect a fingerprint of a user, and the processor 601 recognizes an identity of the user according to the fingerprint collected by the fingerprint sensor 614, or the fingerprint sensor 614 recognizes the identity of the user based on the collected fingerprint. When the identity of the user is identified as a trusted identity, the processor 601 authorizes the user to perform a related sensitive operation. The sensitive operation includes unlocking a screen, viewing encrypted information, downloading software, payment, changing settings, or the like. The fingerprint sensor 614 is disposed on a front face, a back face, or a side face of the terminal 600. When a physical button or a vendor logo is disposed on the terminal 600, the fingerprint sensor 614 is integrated together with the physical button or the vendor logo.

The optical sensor 615 is configured to acquire ambient light intensity. In some embodiments, the processor 601 controls display brightness of the display screen 605 according to the ambient light intensity collected by the optical sensor 615. Specifically, when the ambient light intensity is relatively high, the display brightness of the display screen 605 is turned up; and when the ambient light intensity is relatively low, the display brightness of the display screen 605 is turned down. In another embodiment, the processor 601 further dynamically adjusts a camera parameter of the camera component 606 according to the ambient light intensity acquired by the optical sensor 615.

The proximity sensor 616, also referred to as a distance sensor, is generally disposed on the front panel of the terminal 600. The proximity sensor 616 is configured to collect a distance between the user and the front surface of the terminal 600. In some embodiments, when the proximity sensor 616 detects that the distance between the user and the front surface of the terminal 600 gradually decreases, the display screen 605 is controlled by the processor 601 to switch from the screen-off state to the screen-on state. When the proximity sensor 616 detects that the distance between the user and the front surface of the terminal 600 gradually increases, the display screen 605 is controlled by the processor 601 to switch from the screen-off state to the screen-on state.

A person skilled in the art would understand that the structure shown in FIG. 6 does not constitute a limitation to the terminal 600, and the terminal 600 may include more or fewer components than those shown in the figure, or some components may be combined, or a different component arrangement may be used.

Figure 7:
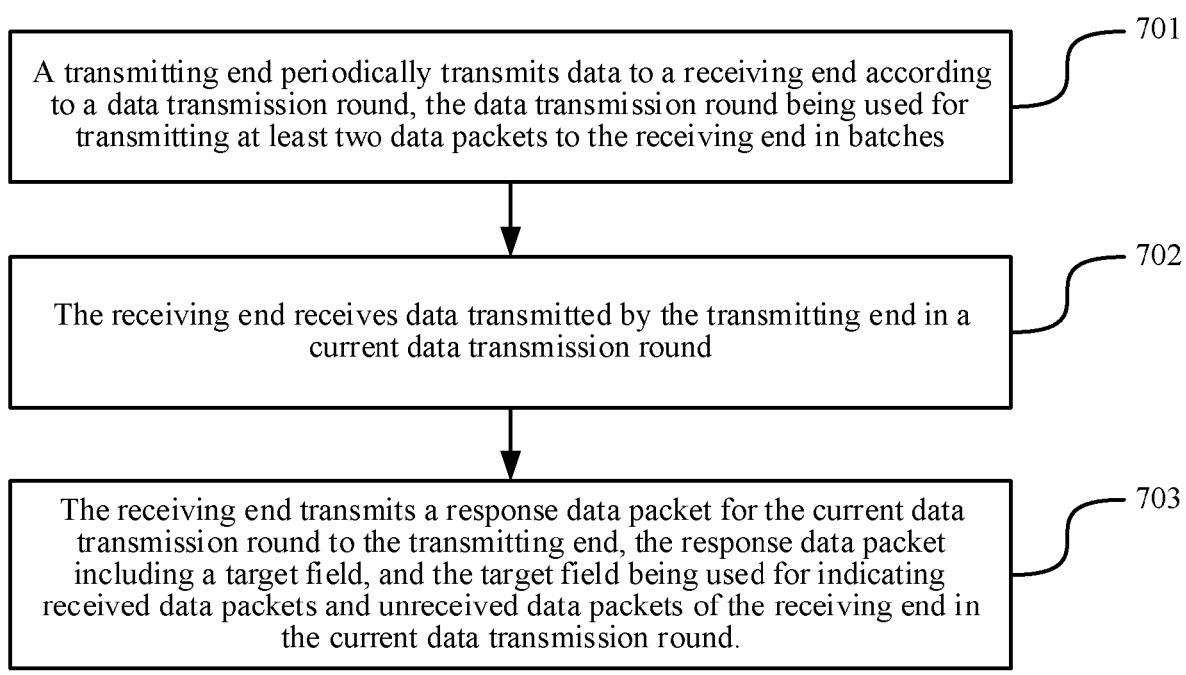
FIG. 7 is a flowchart of a data transmission method according to an embodiment of the disclosure.

FIG. 7 is a flowchart of a data transmission method according to an embodiment of the disclosure.

An interaction body of the method is the transmitting end 301 or the receiving end 302 shown in FIG. 3 or FIG. 4. Referring to FIG. 7, a method procedure provided in this embodiment of the disclosure includes:

701: A transmitting end periodically transmits data to a receiving end according to a data transmission round, the data transmission round being used for transmitting at least two data packets to the receiving end in batches.

Figure 8:
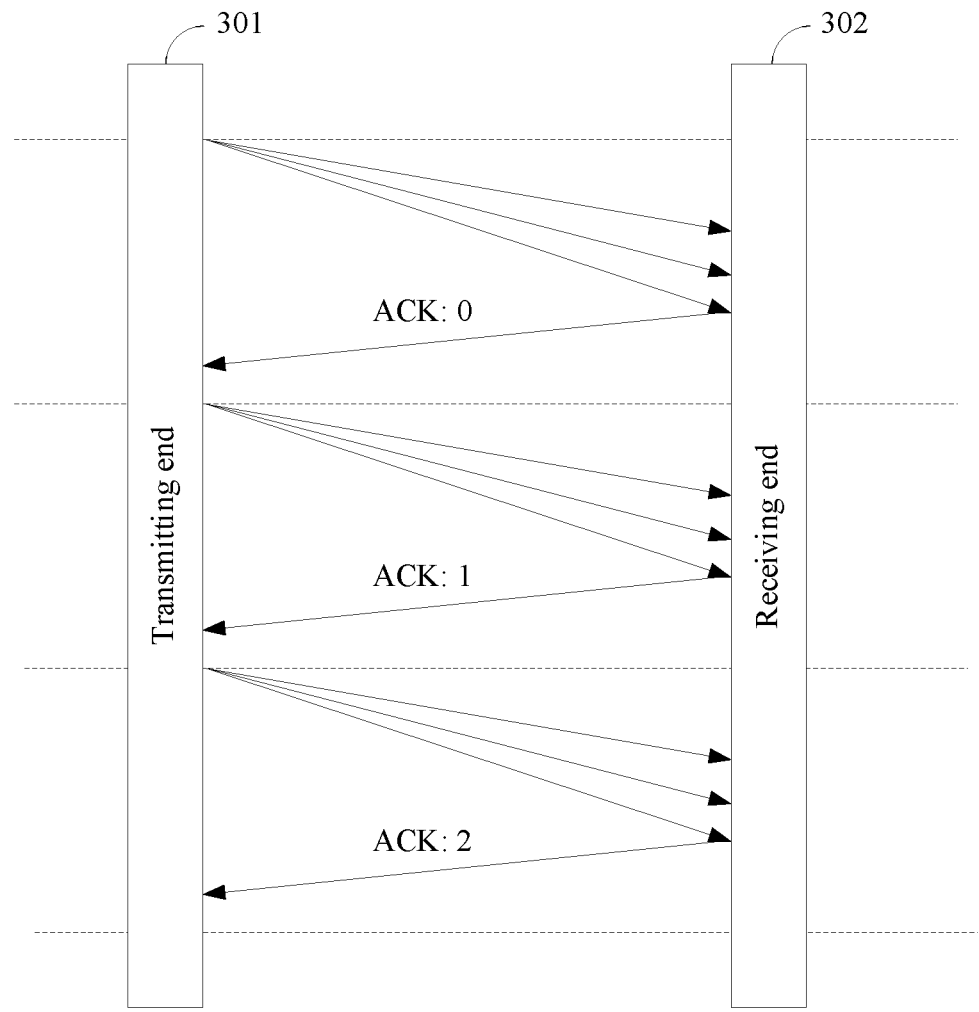
FIG. 8 is a schematic diagram of transmitting data by rounds according to an embodiment of the disclosure.

FIG. 8 is a schematic diagram of data transmission between a transmitting end 301 and a receiving end 302. Data transmission is periodically performed between the transmitting end 301 and the receiving end 302 according to a data transmission round. FIG. 8 shows three data transmission rounds, and the transmitting end 301 transmits a plurality of data packets to the receiving end in each data transmission round. That is, the transmitting end 301 transmits two or more data packets to the receiving end 302 in one data transmission round. In addition, batch refers to batch quantity.

The receiving end 302 marks a round sequence number for each data transmission round, and the round sequence number is also referred to as a round identifier. In some embodiments, round identifiers of the three data transmission rounds shown in FIG. 8 are respectively R0, R1, and R2. This is not specifically limited in the embodiments of the disclosure.

In this embodiment of the disclosure, after data in one data transmission round is transmitted, the receiving end 302 feeds back a response data packet for the data transmission round to the transmitting end 301. In FIG. 8, after data in the data transmission round R0 is transmitted, the receiving end 302 feeds back a response data packet ACK:0 for the data transmission round to the transmitting end 301; after data in the data transmission round R1 is transmitted, the receiving end 302 feeds back a response data packet ACK:1 for the data transmission round to the transmitting end 301; and after data in the data transmission round R2 is transmitted, the receiving end 302 feeds back a response data packet ACK:2 for the data transmission round to the transmitting end 301.

In some embodiments, the data transmission round provided in the embodiments of the disclosure is determined according to a time at which the transmitting end provides data to a network interface card. Data may be transmitted in each data transmission round at an interval of hundreds of milliseconds. This is not specifically limited in the embodiments of the disclosure.

702: The receiving end receives data transmitted by the transmitting end in a current data transmission round.

As described above, since the transmitting end transmits at least two data packets to the receiving end in one data transmission round in batches, when there is no emergency such as packet loss, the receiving end normally receives the at least two data packets included in the current data transmission round.

703: The receiving end transmits a response data packet for the current data transmission round to the transmitting end, the response data packet including a target field, and the target field being used for indicating received data packets and unreceived data packets of the receiving end in the current data transmission round.

In this embodiment of the disclosure, the response data packet indicates a data arrival situation in the current data transmission round in detail by using the target field, and specifically indicates which data packet has been received and which data packet has not been received in the data transmission round.

The related art method has a limitation that the SACK can only represent at most 4 sets of boundary values and cannot represent if more than 4 data segments have not been acknowledged. An embodiment of the disclosure provides a new ACK structure capable of representing more data. That is, a response data packet returned from the receiving end not only indicates data packets that have been received in a corresponding data transmission round, but also indicates data packets that have not received in the data transmission round. Based on this, the transmitting end may quickly determine the data arrival situation in the data transmission round after receiving the response data packet.

Figure 9:
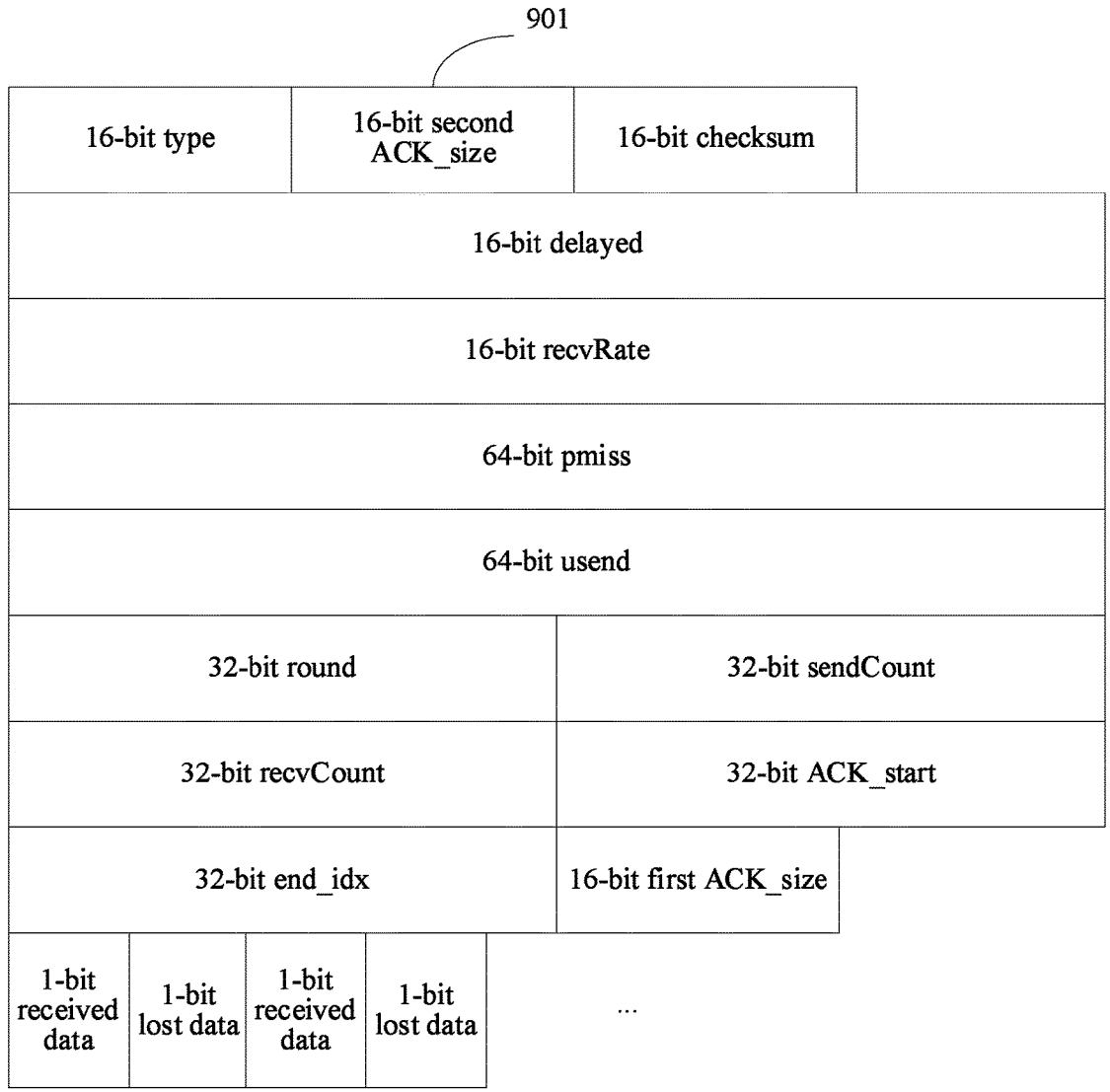
FIG. 9 is a schematic structural diagram of a response data packet according to an embodiment of the disclosure.

FIG. 9 shows a structural diagram of a response data packet 901 according to an embodiment of the disclosure. Feedback information carried by the response data packet 901 returned from the receiving end is described below with reference to FIG. 9. The feedback information includes a type field, a first ACK_size field, a checksum field, a delayed field, a recvRate field, a pmiss field, a usend field, a round field, a sendCount field, a recvCount field, an ACK_start field, an end_idx field, a second ACK_size field, and ACK data fields. The foregoing fields are explained as follows:

The type field is a 16-bit unsigned integer and is used for recording a data packet type. That is, the field is used to indicate that the data packet is a response acknowledgment packet used for responding to acknowledgment.

The size field is a 16-bit unsigned integer and is used for recording a response data packet size. For ease of distinction, the ACK_size field is also referred to as the second ACK_size field in this specification.

The checksum field is a 16-bit unsigned integer, and is a 16-bit checksum.

In some embodiments, operations of obtaining the checksum are as follows:

(1) At a transmitter, the checksum field is first reset to zero, checked adjacent bytes are set 16-bit integers in pairs, all pairings are added, then a carry is added to a low byte of the checksum, for example, the obtained checksum is defined as a, and finally the checksum is negated as −a and −a is stored in the checksum field. (2) If no bit changes during data transmission, the checksum obtained at a receiver needs to be equal to a+(−a), i.e., a one's complement is −0 (all 1). However, a one's complement of the checksum is 0 (all 0). Therefore, the checksum at the receiver corresponding to an undamaged data packet is always 0.

The delayed field is a 64-bit double-precision floating point type, indicates a time of delaying transmitting the response data packet at the receiving end, and represents a staying time at the receiving end. In some embodiments, the delayed field records a time by which the receiving end delays transmitting the response data packet in each data transmission round. The time is also referred to as a first time in this specification.

The recvRate field is a 64-bit double-precision floating point type and is used for recording a receiving rate obtained by the receiving end.

The pmiss field is a 64-bit double-precision floating point type and is used for recording a packet loss rate calculated by the receiving end.

In some embodiments, the receiving rate and the packet loss rate are set for each data transmission round. This is not specifically limited in the embodiments of the disclosure.

The usend field has 64 bits and is used for recording a time at which the transmitting end transmits data. In some embodiments, the time is obtained according to Time ( ).

The time of transmitting data is returned to the transmitting end to obtain an RTT. In some embodiments, the usend field records a time at which the transmitting end transmits data in each data transmission round. The time is also referred to as the second time in this specification.

The round field is a 32-bit unsigned integer and is used for marking each data transmission round.

The sendCount field is a 32-bit unsigned integer and is used for recording the amount of data transmitted by the transmitting end in the data transmission round.

The recvCount field is a 32-bit unsigned integer and is used for recording the amount of data received by the receiving end in each data transmission round.

In some embodiments, the foregoing data amount refers to a quantity of transmitted data packets or received data packets. This is not specifically limited in the embodiments of the disclosure.

The ACK_start field is a 32-bit unsigned integer.

The end_idx field is a 32-bit unsigned integer.

The ACK_size field is a 16-bit unsigned integer and is used for recording a size of an ACK array. The ACK_size field is also referred to as the first ACK_size field in this specification.

In some embodiments, the receiving rate is obtained based on each data transmission round taken from a time at which the first data packet is received to a time at which the last data packet arrives. That is, the receiving rate is obtained according to (a start time at which first data arrives in each data transmission round+an end time at which last data has been received in a full round) so that calculation accuracy of the receiving rate is improved. In addition, statistics of data transmitting amount and data receiving amount in each data transmission round may be collected, so that more detailed data transmission situations may be obtained.

The ACK data fields are of a character pointer type and refer to specific ACK data in the ACK array.

Figure 10:
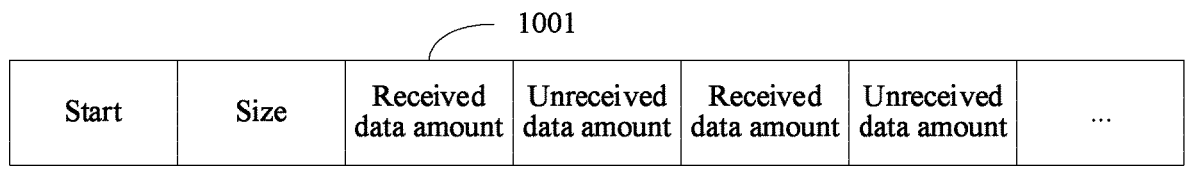
FIG. 10 is a schematic structural diagram of acknowledgement (ACK) data according to an embodiment of the disclosure.

In some embodiments, a structure of a target field 1001 is shown in FIG. 10. FIG. 10 is a schematic structural diagram of acknowledgement (ACK) data according to an embodiment of the disclosure. The target field includes an ACK_start field (corresponding to "start" in FIG. 10), a first ACK_size field (corresponding to "size" in FIG. 10), M first-class data bits (get), and N second-class data bits (lost). M and N are positive integers.

The reason why the target field includes no end_idx field is that an end_idx may be determined according to the ACK_start field, the first ACK_size field, the M first-class data bits (corresponding to "received data amount" in FIG. 10), and the N second-class data bits (corresponding to "unreceived data amount" in FIG. 10). An end_idx given in an end_idx field in FIG. 9 may be used for checking.

In a response data packet of a data transmission round, the end_idx field is used for recording a second serial number of a first data packet. The first data packet is a tail data packet acknowledged and received by the receiving end in the data transmission round.

As shown in FIG. 9 and FIG. 10, the first-class data bit (get) and the second-class data bit (lost) appear alternately. That is, a second-class data bit appears after a first-class data bit, next, a first-class data bit appears, and so on. In this way, such data bits form the foregoing specific ACK data.

For any data transmission round, the ACK_start field is used for recording a first serial number. The first serial number corresponds to a head data packet received by the receiving end in the data transmission round; and the first-class data bit is used for recording a quantity of data packets continuously received by the receiving end in the data transmission round, and the second-class data bit is used for recording a quantity of data packets continuously lost by the receiving end in the data transmission round.

For example, it is assumed that the transmitting end transmits 20 data packets with serial numbers of 1 to 20 respectively to the receiving end in a data transmission round. If the data packets with the serial numbers of 1 to 10 are received by the receiving end, but the data packet with the serial number of 11 is lost, and the data packets with the serial numbers of 12 to 20 are also received by the receiving end, an arrival situation of the 20 data packets is represented in the form of 10-1-9 based on the structures shown in FIG. 9 or FIG. 10. In the representation of 10-1-0, 10 indicates that the data packets with the serial numbers of 1 to 10 are received, that is, the receiving end continuously receives the data packets with the serial numbers of 1 to 10; 1 indicates that the data packet with the serial number of 11 is not received, that is, the data packet with the serial number of 11 is lost; 9 indicates that the data packets with the serial numbers of 12 to 20 are received, that is, the receiving end continuously receives the data packets with the serial numbers of 12 to 20.

Compared with the SACK, the ACK representation manner according to an example embodiment may represent more data. Referring to the foregoing example, the arrival situation of 20 data packets may be represented in detail, i.e., which data packets have arrived and which data packets have not arrived are represented. In addition, in a case that data aggregation occurs, the storage efficiency may also be significantly improved in this ACK representation manner. Still referring to the foregoing example, a detailed arrival situation of 20 data packets may be represented by using 2 first-class data bits and 1 second-class data bit.

The data transmission method provided in the embodiments of the disclosure has at least the following beneficial effects:

In this embodiment of the disclosure, the transmitting end periodically transmits data according to the data transmission round, correspondingly, the ACK returned from the receiving end corresponds to the data transmission round, that is, in this embodiment of the disclosure, the ACK is transmitted according to the round. Compared with an acknowledgment response manner in which the receiving end immediately returns an ACK to the receiver each time receiving a data packet, the ACK representation manner according to an example embodiment may greatly reduce the transmission frequency of the ACK, thereby avoiding occupying a network bandwidth and reducing data waste.

In addition, the data transmission solution provided in the embodiments of the disclosure performs data transmission according to the round, so that data statistics are more accurate. For example, each data transmission round is marked, and statistics of data transmitting amount and data receiving amount in each data transmission round are collected, so that more detailed information may be represented, thereby providing more information for transmission control.

In addition, in this embodiment of the disclosure, the ACK data adopts the data structures shown in FIG. 9 and FIG. 10 to expand data bits that may be used, that is, an optimized ACK structure is designed to represent more data. In a response data packet transmitted by a receiving end, a structure, i.e., a received data amount—an unreceived data amount-a received data amount—an unreceived data amount . . . is used to indicate which data packet has arrived and which data packet has not arrived. Compared with a SACK manner that can only represent at most 4 sets of intervals, in the embodiments of the disclosure, an arrival situation of more data may be represented in detail. In addition, in a case that data aggregation occurs, the storage efficiency may also be significantly improved in such representation manner.

That is, in the embodiments of the disclosure, a problem in a TCP solution of the related art that the ACK data may only represent data of accumulated acknowledgment by using 32 bits in a TCP header and cannot represent an emergency such as packet loss is resolved. In addition, a problem that a SACK manner can only represent at most 4 sets of boundary values and cannot fully represent the data arrival situation in detail is also resolved.

A delay ACK may also reduce the transmission frequency of the ACK. However, in the delay ACK, a delayed timeout time needs to be set, and information update of the transmission solution is adversely affected if an excessive long timeout time is set.

Based on the above, the new ACK mechanism according to example embodiment of the disclosure provides reliable transmission and transmission control data for an upper-layer transmission protocol, may be applied to an X next generation transmission protocol (XNTP), and may be applied to a P2P transmission scenario of a live video. The data transmission solution based on the ACK mechanism provides a stable and reliable transmission channel for video data transmission and has an improved effect.

In another example embodiment, for out-of-sequence data, an embodiment of the disclosure further introduces delay check and timeout check, so that the transmission efficiency of the out-of-sequence data is improved, and reliable data transmission and transmission control may be basically guaranteed. Detailed descriptions are as follows:

The TCP adopts an accumulated acknowledgment mechanism by default. The receiving end may repeatedly acknowledge the last data packet that arrives in sequence if data arrives out of sequence. Based on this, the transmitting end may only repeatedly transmit a next data packet after the data packet that arrives the receiving end in sequence, and therefore, the transmitting end cannot accurately determine which data packets have arrived and which data packets have not arrived. That is, the ACK mechanism in the related art is not sufficient to support a case in which data arrives out of sequence. Only the repeated ACK is returned to the transmitting end when data arrives out of sequence, and the transmitting end retransmits related data after the ACK is repeated over a specific quantity of times. However, if data only arrives out of sequence, repeated transmission of related data wastes a network bandwidth.

In this embodiment of the disclosure, an ACKNDUPACK mechanism is introduced, which is also referred to as the delay check and addresses a case in which data arrives out of sequence. That is, the data transmission method provided in the embodiments of the disclosure may further include:

determining a third serial number of a second data packet for a current data transmission round, and determining a second serial number of a first data packet according to the third serial number of the second data packet and a target serial number threshold.

The second data packet is a data packet finally received by the receiving end in the data transmission round. The second serial number of the first data packet is less than the third serial number of the second data packet. In addition, the first data packet is a tail data packet acknowledged and received by the receiving end in the data transmission round.

In some embodiments, a value of the target serial number threshold is 3, that is, a difference between a serial number of a real tail data packet and a serial number of a current data packet acknowledged by the receiving end is 3. This is not specifically limited in the embodiments of the disclosure.

For example, assuming that a serial number of a data packet most recently received by the receiving end is 100, the receiving end may only collect statistics of a data packet indicated by a serial number obtained by subtracting ACKNDUPACK from 100. For example, a value of ACKNDUPACK is 3, and the receiving end only acknowledges that a data packet with the serial number of 97 is received.

In addition, in this embodiment of the disclosure, a timeout mechanism is further introduced, which is also referred to as the timeout check, so that a problem that the tail data packet cannot feed back the ACK may be resolved. That is, the receiving end may feed back the ACK to the transmitting end if an arrival time of the tail data packet exceeds an RTT. That is, the data transmission method provided in this embodiment of the disclosure further includes: transmitting, for a current data transmission round, a response data packet for the second data packet to the transmitting end in response to an arrival time of the second data packet (a real tail data packet) exceeding an RTT. In some embodiments, a structure of the response data packet for the second data packet is shown in FIG. 9.

In some embodiments, the foregoing RTT is determined according to a first time, a second time, and a third time. The first time is a time by which the receiving end delays transmitting the response data packet in the data transmission round, the second time is a time at which the transmitting end transmits data in the data transmission round, and the third time is a time at which the transmitting end receives the response data packet for the data transmission round. The first time corresponds to the foregoing delayed field, the second time corresponds to the foregoing usend field, and third time is represented by a symbol uget and refers to a time at which the transmitting end receives the response data packet, that is, RTT=uget-usend-delayed.

Although the operations are described in a sequential order according to the instructions of the arrows in the flowcharts of the embodiments in the drawings, the operations are not necessarily performed sequentially according to the sequence instructed by the arrows. Unless clearly specified in this specification, there is no strict sequence limitation on the execution of the operations, and the operations may be performed in another sequence. Moreover, at least some of the operations in the foregoing embodiments may include a plurality of sub-operations or a plurality of stages. The sub-operations or the stages are not necessarily performed at the same time, but may be performed at different times. This is not specifically limited in the embodiments of the disclosure.

Figure 11:
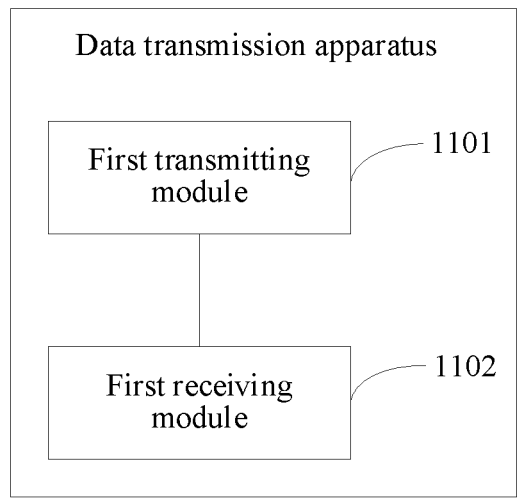
FIG. 11 is a schematic structural diagram of a data transmission apparatus according to an embodiment of the disclosure.

FIG. 11 is a structural diagram of a data transmission apparatus according to an embodiment of the disclosure. The apparatus is applicable to a transmitting end, including:
- a first receiving module 1101, configured to receive data transmitted by a transmitting end in a current data transmission round; and
- a first transmitting module 1102, configured to transmit a response data packet for the data transmission round to the transmitting end,
- the response data packet including a target field, and the target field being used for indicating received data packets and unreceived data packets of the receiving end in the data transmission round.

The data transmission apparatus provided in this embodiment of the disclosure transmits, after receiving data transmitted by the transmitting end in a current data transmission round, a response data packet for the data transmission round to the transmitting end. The response data packet includes a target field, and the target field is used for indicating received data packets and unreceived data packets of the receiving end in the data transmission round. For the foregoing data transmission manner, the response data packet clearly indicates the received data packets and unreceived data packets of the receiving end in the data transmission round, that is, the receiving end may indicate an arrival situation of the data packet in detail, so that the transmitting end may further determine which data packets have arrived and which data packets have not arrived according to the received response data packet, thereby resolving an emergency such as packet loss. Therefore, such data transmission manner has an improved effect.

In some embodiments, the target field includes an ACK_start field, M first-class data bits, and N second-class data bits, where
- the first-class data bit and the second-class data bit appear alternately, and M and N are positive integers;
- the ACK_start field is used for recording a first serial number, the first serial number corresponding to a head data packet received by the receiving end in the data transmission round; and the first-class data bit is used for recording a quantity of data packets continuously received by the receiving end in the data transmission round, and the second-class data bit is used for recording a quantity of data packets continuously lost by the receiving end in the data transmission round.

In some embodiments, the data transmission round is used for transmitting at least two data packets to the receiving end in batches, where
- the data transmission round is determined according to a time at which the transmitting end provides data to a network interface card.

In some embodiments, the response data packet further includes: a round field, a sendCount field, a recvCount field, and an end_idx field;
- the round field is used for recording a round identifier of the data transmission round;
- the sendCount field is used for recording a quantity of data packets transmitted by the transmitting end in the data transmission round;
- the recvCount field is used for recording a quantity of data packets received by the receiving end in the data transmission round; and
- the end_idx field is used for recording a second serial number of a first data packet, the first data packet being a tail data packet acknowledged and received by the receiving end in the data transmission round.

In some embodiments, the response data packet further includes: a delayed field and a usend field;
- the delayed field is used for recording a first time, the first time being a time by which the receiving end delays transmitting the response data packet in the data transmission round; and
- the usend field is used for recording a second time, the second time being a time at which the transmitting end transmits data in the data transmission round.

In some embodiments, the response data packet further includes: a type field, a first ACK_size field, a second ACK_size field, a checksum field, a recvRate field, and a pmiss field;
- the type field is used for recording a data packet type;
- the first ACK_size field is used for recording a size of the target field;
- the second ACK_size field is used for recording a size of the response data packet;
- the recvRate field is used for recording a data receiving rate determined by the receiving end in the data transmission round; and
- the pmiss field is used for recording a packet loss rate determined by the receiving end in the data transmission round.

In some embodiments, the apparatus further includes:
- a determining module, configured to determine a third serial number of a second data packet; and determine the second serial number of the first data packet according to the third serial number of the second data packet and a target serial number threshold,
- the second data packet being a data packet finally received by the receiving end in the data transmission round, and the second serial number being less than the third serial number.

In some embodiments, the first transmitting module is further configured to transmit a response data packet for the second data packet to the transmitting end in response to an arrival time of the second data packet exceeding an RTT, the RTT being determined according to a first time, a second time, and a third time.

The first time is a time by which the receiving end delays transmitting the response data packet in the data transmission round, the second time is a time at which the transmitting end transmits data in the data transmission round, and the third time is a time at which the transmitting end receives the response data packet for the data transmission round.

All the foregoing optional technical solutions may be arbitrarily combined to form an optional embodiment of the disclosure, and details are not described herein again.

Figure 12:
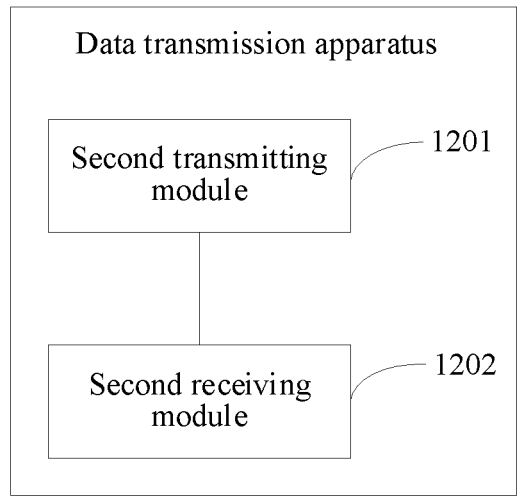
FIG. 12 is a schematic structural diagram of a data transmission apparatus according to an embodiment of the disclosure.

FIG. 12 is a structural diagram of a data transmission apparatus according to an embodiment of the disclosure. The apparatus is applicable to a receiving end, including:
- a second transmitting module 1201, configured to transmit data in a current data transmission round to a receiving end; and
- a second receiving module 1202, configured to receive a response data packet for the data transmission round transmitted by the receiving end,
- the response data packet including a target field, and the target field being used for indicating received data packets and unreceived data packets of the receiving end in the data transmission round.

The data transmission apparatus provided in the embodiments of the disclosure transmits data to the receiving end in a current data transmission round, and the receiving end transmits a response data packet for the data transmission round to the transmitting end. The response data packet includes a target field, and the target field is used for indicating received data packets and unreceived data packets of the receiving end in the data transmission round. For the foregoing data transmission manner, the response data packet clearly indicates the received data packets and unreceived data packets of the receiving end in the data transmission round, that is, the receiving end may indicate an arrival situation of the data packet in detail, so that the transmitting end may further determine which data packets have arrived and which data packets have not arrived according to the received response data packet, thereby resolving an emergency such as packet loss. Therefore, such data transmission manner has an improved effect.

In some embodiments, the data transmission round is used for transmitting at least two data packets to the receiving end, where
  the data transmission round is determined according to a time at which the transmitting end provides data to a network interface card.

In some embodiments, the response data packet further includes: a round field, a sendCount field, a recvCount field, and an end_idx field;
  the round field is used for recording a round identifier of the data transmission round;
  the sendCount field is used for recording a quantity of data packets transmitted by the transmitting end in the data transmission round;
  the recvCount field is used for recording a quantity of data packets received by the receiving end in the data transmission round; and
  the end_idx field is used for recording a second serial number of a first data packet, the first data packet being a tail data packet acknowledged and received by the receiving end in the data transmission round.

In some embodiments, the response data packet further includes: a delayed field and a usend field;
  the delayed field is used for recording a first time, the first time being a time by which the receiving end delays transmitting the response data packet in the data transmission round; and
  the usend field is used for recording a second time, the second time being a time at which the transmitting end transmits data in the data transmission round.

In some embodiments, the response data packet further includes: a type field, a first ACK_size field, a second ACK_size field, a checksum field, a recvRate field, and a pmiss field;
  the type field is used for recording a data packet type;
  the first ACK_size field is used for recording a size of the target field;
  the second ACK_size field is used for recording a size of the response data packet;
  the recvRate field is used for recording a data receiving rate determined by the receiving end in the data transmission round; and
  the pmiss field is used for recording a packet loss rate determined by the receiving end in the data transmission round.

All the foregoing optional technical solutions may be arbitrarily combined to form an optional embodiment of the disclosure, and details are not described herein again.

When the data transmission method provided in the foregoing embodiment performs data transmission, division of the functional modules above is merely used as an example for description. During practical application, the function distribution may be implemented by different functional modules according to requirements, that is, an internal structure of the apparatus is divided into different functional modules, to implement all or some of the functions described above. In addition, the data transmission apparatus and the data transmission method embodiments provided in the foregoing embodiments belong to the same conception. For the specific implementation process, reference may be made to the method embodiments, and details are not described herein again.

In an exemplary embodiment, a computer-readable storage medium, for example, a memory including instructions, is further provided. The instructions may be executed by a processor in a terminal to implement the data transmission method performed by the transmitting end or the data transmission method performed by the receiving end in the foregoing embodiments. For example, the computer-readable storage medium is a read-only memory (ROM), a random access memory (RAM), a compact disc read-only memory (CD-ROM), a magnetic tape, a floppy disk, an optical data storage device, or the like.

A person of ordinary skill in the art would understand that all or some of the operations of the embodiments may be implemented by hardware or a program instructing related hardware. The program is stored in a computer-readable storage medium. The storage medium includes a read-only memory, a magnetic disk, or an optical disc.

At least one of the components, elements, modules or units described herein may be embodied as various numbers of hardware, software and/or firmware structures that execute respective functions described above, according to an example embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the block diagrams, communication between the components, elements or units may be performed through the bus. Functional aspects of the above embodiments may be implemented in algorithms that execute on one or more processors. Furthermore, the components, elements or units represented by a block or processing operations may employ any number of related art techniques for electronics configuration, signal processing and/or control, data processing and the like.

The foregoing descriptions are merely optional embodiments of the disclosure, but are not intended to limit the disclosure. Any modification, equivalent replacement, or improvement made within the spirit and principle of the disclosure shall fall within the protection scope of the disclosure.

What is claimed is:

1. A data transmission method, performed by a receiving end, the method comprising:
   receiving at least one data packet among data packets transmitted by a transmitting end in a data transmission round; and
   transmitting, to the transmitting end, a response data packet for the data transmission round,
   the response data packet comprising a target field, the target field indicating a received data packet and an unreceived data packet at the receiving end, among the data packets transmitted in the data transmission round,
   wherein the target field comprises an ACK_start field, and a first serial number is recorded in the ACK_start field, the first serial number corresponding to a head data packet received by the receiving end in the data transmission round, and
   wherein the response data packet further comprises an end_idx field, and a second serial number of a first data packet is recorded in the end_idx field, the first data packet being a tail data packet acknowledged and received by the receiving end in the data transmission round.

2. The method according to claim 1, wherein the target field further comprises M first-class data bits, and N second-class data bits;
   the M first-class data bits and the N second-class data bits appear alternately, and M and N are positive integers;
   a quantity of one or more data packets continuously received by the receiving end in the data transmission round is recorded in the M first-class data bits, and a quantity of one or more data packets continuously lost by the receiving end in the data transmission round is recorded in the N second-class data bits.

3. The method according to claim 1, wherein the data transmission round is determined based on a time at which the transmitting end provides data to a network interface card.

4. The method according to claim 1, wherein the response data packet further comprises: a round field, a sendCount field, and a recvCount field;
   a round identifier of the data transmission round is recorded in the round field;
   a quantity of data packets transmitted by the transmitting end in the data transmission round is recorded in the sendCount field; and
   a quantity of data packets received by the receiving end in the data transmission round is recorded in the recvCount field.

5. The method according to claim 4, further comprising: determining a third serial number of a second data packet; and
   determining the second serial number of the first data packet based on the third serial number of the second data packet and a target serial number threshold,
   the second data packet being a data packet finally received by the receiving end in the data transmission round, and the second serial number being less than the third serial number.

6. The method according to claim 5, further comprising: transmitting a response data packet for the second data packet to the transmitting end based on an arrival time of the second data packet exceeding a round-trip time (RTT), the RTT being determined based on a first time, a second time, and a third time,
   the first time being a time by which the receiving end delays transmitting the response data packet in the data transmission round, the second time being a time at which the transmitting end transmits data in the data transmission round, and the third time being a time at which the transmitting end receives the response data packet for the data transmission round.

7. The method according to claim 1, wherein the response data packet further comprises: a delayed field and a usend field;
   a first time is recorded in the delayed field, the first time being a time by which the receiving end delays transmitting the response data packet in the data transmission round; and
   a second time is recorded in the usend field, the second time being a time at which the transmitting end transmits data in the data transmission round.

8. The method according to claim 1, wherein the response data packet further comprises: a type field, a first ACK_size field, a second ACK_size field, a checksum field, a recvRate field, and a pmiss field;
   a data packet type is recorded in the type field;
   a size of the target field is recorded in the first ACK_size field;
   a size of the response data packet is recorded in the second ACK_size field;
   a data receiving rate determined by the receiving end in the data transmission round is recorded in the recvRate field; and
   a packet loss rate determined by the receiving end in the data transmission round is recorded in the pmiss field.

9. An electronic device, comprising a processor and a memory, the memory storing at least one instruction, the at least one instruction being loaded and executed by the processor to implement the method of claim 1.

10. A non-transitory computer-readable storage medium, storing at least one instruction, the at least one instruction being loaded and executed by a processor to implement the method of claim 1.

11. A data transmission method, performed by a transmitting end, the method comprising:
    transmitting, to a receiving end, data packets in a data transmission round; and
    receiving, from the receiving end, a response data packet for the data transmission round,
    the response data packet comprising a target field, the target field indicating a received data packet and an unreceived data packet at the receiving end, among the data packets transmitted in the data transmission round,
    wherein the target field comprises an ACK_start field, and a first serial number is recorded in the ACK_start field, the first serial number corresponding to a head data packet received by the receiving end in the data transmission round, and
    wherein the response data packet further comprises an end_idx field, and a second serial number of a first data packet is recorded in the end_idx field, the first data packet being a tail data packet acknowledged and received by the receiving end in the data transmission round.

12. The method according to claim 11, wherein the data transmission round is determined based on a time at which the transmitting end provides data to a network interface card.

13. The method according to claim 11, wherein the response data packet further comprises: a round field, a sendCount field, and a recvCount field, and an end_idx field;
    a round identifier of the data transmission round is recorded in the round field;

a quantity of data packets transmitted by the transmitting end in the data transmission round is recorded in the sendCount field; and a quantity of data packets received by the receiving end in the data transmission round is recorded in the recvCount field.

14. The method according to claim 11, wherein the response data packet further comprises: a delayed field and a usend field;
- a first time is recorded in the delayed field, the first time being a time by which the receiving end delays transmitting the response data packet in the data transmission round; and
- a second time is recorded in the usend field, the second time being a time at which the transmitting end transmits data in the data transmission round.

15. The method according to claim 11, wherein the response data packet further comprises: a type field, a first ACK_size field, a second ACK_size field, a checksum field, a recvRate field, and a pmiss field;
- a data packet type is recorded in the type field;
- a size of the target field is recorded in the first ACK_size field;
- a size of the response data packet is recorded in the second ACK_size field;
- a data receiving rate determined by the receiving end in the data transmission round is recorded in the recvRate field; and
- a packet loss rate determined by the receiving end in the data transmission round is recorded in the pmiss field.

16. An electronic device, comprising a processor and a memory, the memory storing at least one instruction, the at least one instruction being loaded and executed by the processor to implement the method of claim 11.

17. A non-transitory computer-readable storage medium, storing at least one instruction, the at least one instruction being loaded and executed by a processor to implement the method of claim 11.

18. A data transmission apparatus as a receiving end, the apparatus comprising:
- at least one memory configured to store program code; and
- at least one processor configured to read the program code and operate as instructed by the program code, the program code comprising:
  - receiving code configured to cause the at least one processor to receive at least one data packet among data packets transmitted by a transmitting end in a data transmission round; and
  - transmitting code configured to cause the at least one processor to transmit, to the transmitting end, a response data packet for the data transmission round,
  - the response data packet comprising a target field, and the target field indicating a received data packet and an unreceived data packet at the receiving end, among the data packets transmitted in the data transmission round,
wherein the target field comprises an ACK_start field, and a first serial number is recorded in the ACK_start field, the first serial number corresponding to a head data packet received by the receiving end in the data transmission round, and
wherein the response data packet further comprises an end_idx field, and a second serial number of a first data packet is recorded in the end_idx field, the first data packet being a tail data packet acknowledged and received by the receiving end in the data transmission round.

19. The apparatus according to claim 18, wherein the target field further comprises M first-class data bits, and N second-class data bits;
- the M first-class data bits and the N second-class data bits appear alternately, and M and N are positive integers; and
- a quantity of one or more data packets continuously received by the receiving end in the data transmission round is recorded in the M first-class data bits, and a quantity of one or more data packets continuously lost by the receiving end in the data transmission round is recorded in the N second-class data bits.

20. The apparatus according to claim 18, wherein the response data packet further comprises: a round field, a sendCount field, and a recvCount field;
- a round identifier of the data transmission round is recorded in the round field;
- a quantity of data packets transmitted by the transmitting end in the data transmission round is recorded in the sendCount field; and
- a quantity of data packets received by the receiving end in the data transmission round is recorded in the recvCount field.

* * * * *